G. F. BEACH.
FURNACE OR FORGE.
APPLICATION FILED NOV. 4, 1912.

1,140,350.

Patented May 25, 1915.

Witnesses:
J. W. Harris
N. P. Leonard

Inventor:
George F. Beach
by Byrnes Townsend & Brickenstein
Att'ys.

UNITED STATES PATENT OFFICE.

GEORGE F. BEACH, OF NORFOLK, VIRGINIA, ASSIGNOR TO MIRCS FUEL-OIL EQUIPMENT COMPANY, INCORPORATED, OF NORFOLK, VIRGINIA, A CORPORATION OF VIRGINIA.

FURNACE OR FORGE.

1,140,350.            Specification of Letters Patent.            Patented May 25, 1915.

Application filed November 4, 1912. Serial No. 729,447.

*To all whom it may concern:*

Be it known that I, GEORGE F. BEACH, a citizen of the United States, residing at Norfolk, in the county of Norfolk and State of Virginia, have invented certain new and useful Improvements in Furnaces or Forges, of which the following is a specification.

This invention relates to hydrocarbon furnaces or forges, the object of the invention being the provision of a simple, compact and highly efficient furnace adapted for various purposes and more particularly for the working of metals.

My preferred construction is of the general type disclosed in United States Patent 936,573, patented October 12, 1909, to W. Scrimgeor, Jr., and constitutes an improvement thereon.

For a full understanding of the invention reference is made to the accompanying drawings, wherein—

Figure 1:
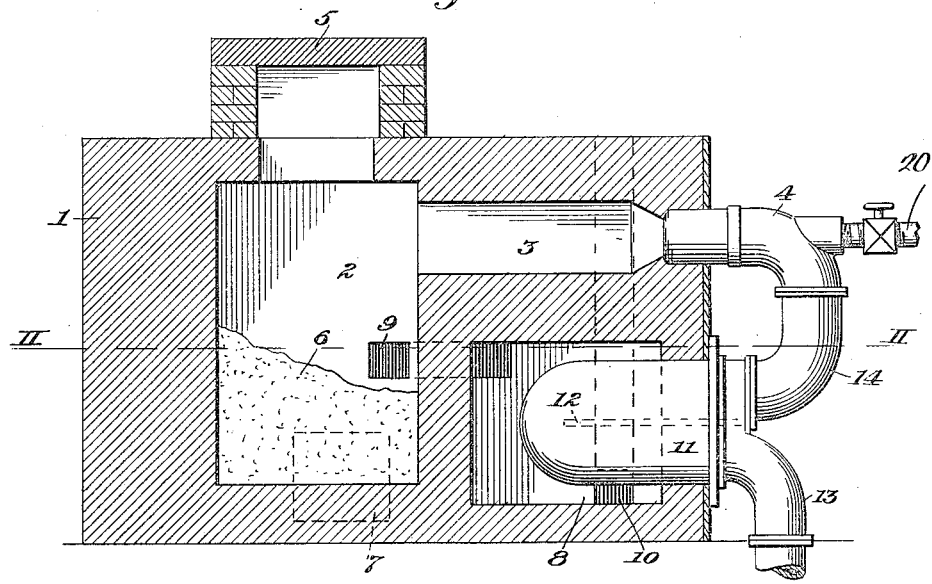
Figure 2:
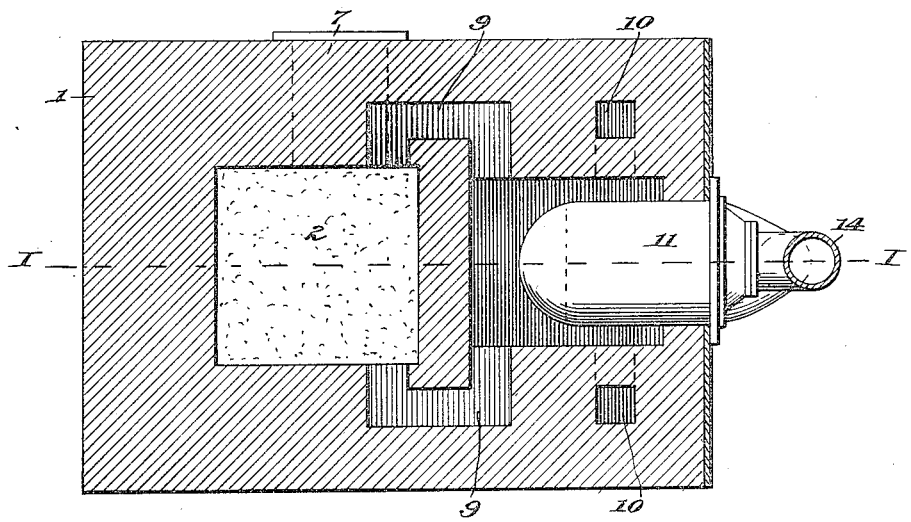

Figure 1 is a central vertical section of a preferred form of furnace on line I—I of Fig. 2; and Fig. 2 is a horizontal section of the same on line II—II of Fig. 1.

The furnace illustrated comprises a refractory setting 1 containing a down-draft heating chamber 2 in direct communication with a horizontal combustion chamber 3, in operative relation with which is mounted a hydrocarbon burner 4, connected to a fuel supply by the valved pipe 20. According to conditions the work may be placed in the heating chamber 2, or over the same as indicated at 5. The bottom of the heating chamber may contain a sand-bed 6 to receive slag, scale and the like.

7 represents the usual clean-out door.

8 is a down-draft preheating chamber, located wholly within the refractory setting, below and in immediate proximity to the combustion chamber 3. This preheating chamber receives the heated gases from the furnace through two lateral flues 9, 9, entering the same at its upper portion, and vents these gases through flues 10, 10, which communicate with the lower portion of the preheating chamber and extend thence upwardly to the top of the furnace, through the refractory walls thereof, and in proximity to the combustion chamber 3.

Mounted in the preheating chamber is a preheater, which in the form illustrated comprises simply a metal casing 11 having a horizontal partial partition or web 12. This preheater is provided with a lower flue 13 communicating with a blower or other source of air under moderate pressure, and with an upper flue 14 for conveying the heated air to the burner 4.

The principal advantages of this construction are as follows: The preheating chamber 8 receives the heated gases directly and without material loss of heat from the heating chamber 2; and by reason of its relatively large size and its location in immediate proximity to the combustion chamber 3, it aids in maintaining the walls of the latter at the high temperature which is required for efficient combustion. At the same time a portion of the heat of the exit gases is transferred to the air-current flowing through the casing 11, and is conveyed to the burner 4, thus further conserving the heat of the combustion chamber 3. In other words, heat from the exit gases moving slowly through the preheating chamber 8 is transferred to the combustion chamber 3 directly through the furnace setting, and also indirectly through the air passing to the burner, with the result that a very high degree of economy and efficiency is attained in the operation of the furnace. This effect is further increased by the arrangement of the vent flues 10 which, as previously noted, extend upwardly within the furnace setting in proximity to the combustion chamber 3.

I claim:

1. In a hydrocarbon furnace or forge, a combustion chamber, a burner in operative relation thereto, a down-draft heating chamber, said combustion chamber opening into the upper part of said heating chamber, a vent flue communicating with said heating chamber below the opening of the combustion chamber, a preheating chamber directly beneath and in proximity to said combustion chamber, a preheater in said preheating chamber, and an air conduit between said preheater and burner.

2. In a hydrocarbon furnace or forge, a combustion chamber, a burner in operative relation thereto, a down-draft heating chamber, said combustion chamber opening into the upper part of said heating chamber, a vent flue communicating with said heating chamber below the opening of the combustion chamber, a down-draft preheating chamber directly beneath and in proximity to said combustion chamber, said vent flue opening into the upper part of said preheating chamber, the outlet of said vent flue extending from the lower part of said preheating chamber upwardly and in proximity to said combustion chamber, and an air conduit between said preheater and burner.

3. In a hydrocarbon furnace or forge, a combustion chamber, a burner in operative relation thereto, a down-draft heating chamber, said combustion chamber opening into the upper part of said heating chamber, vent flues communicating with said heating chamber extending from the side walls thereof and below the opening of the combustion chamber, a down-draft preheating chamber directly beneath and in proximity to said combustion chamber, said vent flues opening into the upper part of the sides of said preheating chamber, the outlet of said vent flue extending from the lower part of the sides of said preheating chamber upwardly and in proximity to said combustion chamber, and an air conduit between said preheater and burner.

In testimony whereof I affix my signature in presence of two witnesses.

GEORGE F. BEACH.

Witnesses:
BLANCHE M. MILLS,
ELVA G. SHORTT.

Copies of this patent may be obtained for five cents each, by addressing the "Commissioner of Patents, Washington, D. C."